(12) United States Patent
Karges et al.

(10) Patent No.: US 10,549,661 B2
(45) Date of Patent: Feb. 4, 2020

(54) ACOUSTIC SEAL FOR VEHICLE SEAT

(71) Applicant: Lear Corporation, Southfield, MI (US)

(72) Inventors: Mark Karges, Macomb, MI (US); Kyle Smith, Berkley, MI (US); Mark Allyn Folkert, Farmington Hills, MI (US)

(73) Assignee: LEAR CORPORATION, Southfield, MI (US)

( * ) Notice: Subject to any disclaimer, the term of this patent is extended or adjusted under 35 U.S.C. 154(b) by 180 days.

(21) Appl. No.: 15/663,991

(22) Filed: Jul. 31, 2017

(65) Prior Publication Data

US 2019/0030994 A1 Jan. 31, 2019

(51) Int. Cl.
*B60N 2/56* (2006.01)
*B60H 1/24* (2006.01)
*B60H 1/00* (2006.01)
*G10K 11/16* (2006.01)

(52) U.S. Cl.
CPC .......... *B60N 2/5664* (2013.01); *B60H 1/248* (2013.01); *G10K 11/16* (2013.01); *B60H 2001/006* (2013.01)

(58) Field of Classification Search
CPC .... B60N 2/5664; B60N 2/5621; B60H 1/248; B60H 2001/006
See application file for complete search history.

(56) References Cited

U.S. PATENT DOCUMENTS

| | | | | |
|---|---|---|---|---|
| 4,685,727 A * | 8/1987 | Cremer | ................ | B60N 2/5635 297/180.14 |
| 5,267,739 A * | 12/1993 | Vaughan | ................ | B60J 10/00 277/642 |
| 5,597,200 A * | 1/1997 | Gregory | ................ | A47C 7/74 297/180.13 |
| 5,782,537 A | 7/1998 | Leistra et al. | | |
| 6,277,023 B1 * | 8/2001 | Schwarz | ............ | B60N 2/5635 297/180.14 |
| 7,322,643 B2 * | 1/2008 | Ishima | ................ | B60N 2/5621 297/180.1 |
| 7,419,209 B1 | 9/2008 | Mangiapane et al. | | |
| 8,215,701 B1 * | 7/2012 | Mori | ........................ | B60J 10/24 296/146.9 |
| 9,096,157 B2 | 8/2015 | Line et al. | | |
| 2008/0296075 A1 | 12/2008 | Zhu et al. | | |
| 2015/0140915 A1 * | 5/2015 | Rawlinson | ........... | B60N 2/5621 454/120 |
| 2016/0264029 A1 * | 9/2016 | Thomas | ................ | B60N 2/5678 |
| 2017/0072821 A1 * | 3/2017 | Oh | ........................ | B60N 2/5635 |
| 2018/0126881 A1 * | 5/2018 | Ui | ........................ | B60N 2/5642 |

FOREIGN PATENT DOCUMENTS

JP 2008125963 A 6/2008

* cited by examiner

*Primary Examiner* — David R Dunn
*Assistant Examiner* — Tania Abraham
(74) *Attorney, Agent, or Firm* — Brooks Kushman P.C.

(57) ABSTRACT

A vehicle seat and seating system is disclosed that includes a seat portion (e.g., seat bottom, seat back) defining a cavity with an inlet in fluid communication with a vehicle cabin and an outlet in fluid communication with an ambient environment. The cavity with the inlet and outlet provide an exhaust to allow air in the cabin to escape to the ambient environment when the air is pressurized due to, for example, a vehicle door closing. An acoustic seal is provided adjacent the cavity and is configured to seal at least a portion of the passageway to reduce or dampen sound from entering the cabin.

20 Claims, 2 Drawing Sheets

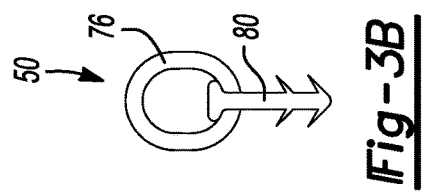
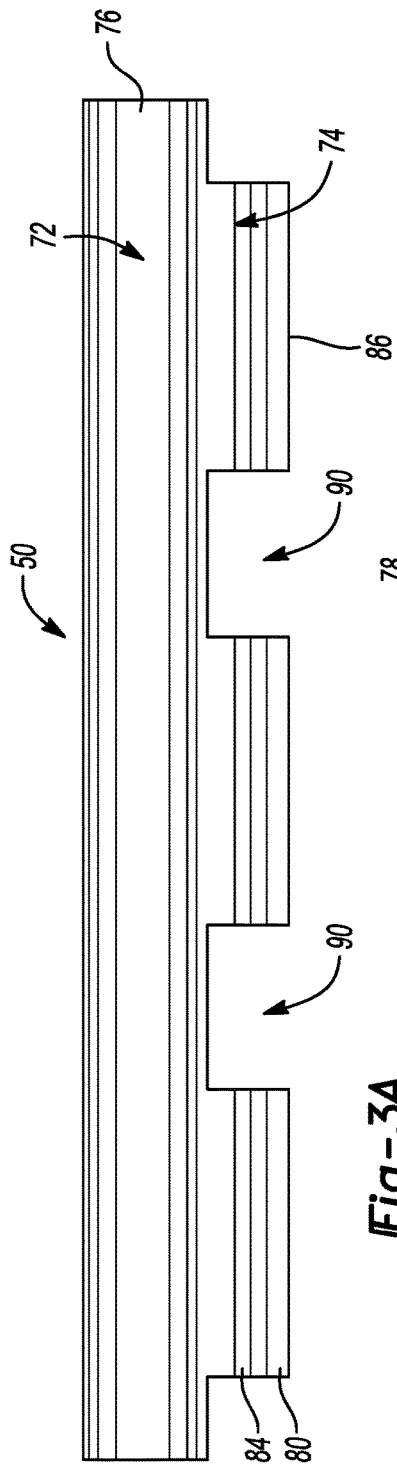
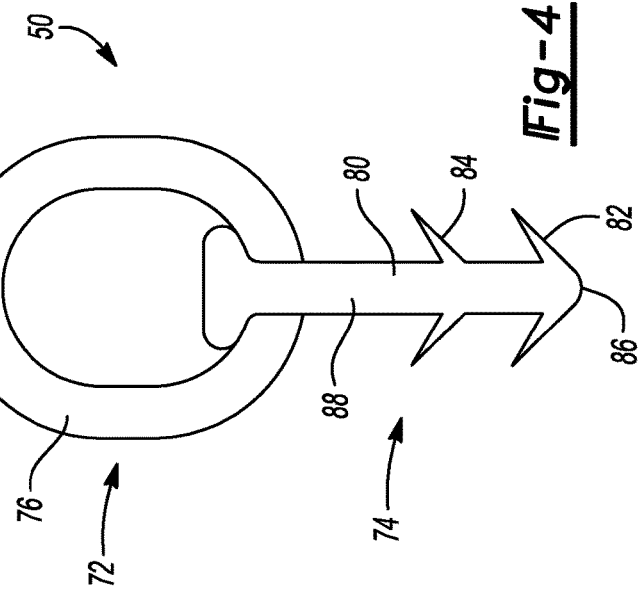

ACOUSTIC SEAL FOR VEHICLE SEAT

TECHNICAL FIELD

This disclosure relates to an acoustic seal attached to a vehicle seat. More particularly, this disclosure relates to a seal disposed around or near an air passageway formed into a back side of a vehicle seat.

BACKGROUND

When vehicle doors are opened and closed, a pressure differential can be realized in the cabin of the vehicle. For example, if there is no escape for the air in the cabin, the interior of the cabin can become pressurized when the door is shut. If unaccounted for, this can cause an undesirable sensation for individuals in the vehicle.

Air extractors are known in the art to relieve cabin air pressure fluctuations when the doors are opened or closed. Air extractors are typically holes or passageways in the floors, walls, dashes, etc. These can be susceptible to increased noise in the vehicle cabin.

SUMMARY

According to one embodiment, a seating system for a vehicle includes a seat back that includes a cushion having a forward surface and a rearward surface. The rearward surface defines an air inlet in fluid communication with a vehicle cabin for receiving air from the vehicle cabin. The rearward surface also defines an air outlet in fluid communication with an ambient environment for sending the air to the ambient environment. The rearward surface also defines an air passageway fluidly coupling the air inlet to the air outlet. A bulb seal is attached to the rearward surface adjacent to the air passageway.

According to another embodiment, a vehicle seat includes a seat back having a forward surface and an opposing rearward surface, the rearward surface defining a cavity with an inlet in fluid communication with a vehicle cabin and an outlet in fluid communication with an ambient environment. A bulb seal is attached to the rearward surface about at least a portion of a perimeter of the cavity.

According to yet another embodiment, a seating system for a vehicle having a vehicle cabin is provided. The seating system includes a foam seat portion that defines a cavity providing a passageway configured to direct air from the vehicle cabin to an ambient environment when the vehicle cabin is pressurized. An acoustic seal is provided adjacent the passageway and is configured to seal at least a portion of the passageway.

BRIEF DESCRIPTION OF THE DRAWINGS

FIG. 3A illustrates a side view of the seal, according to one embodiment.

FIG. 3B is an end view of the seal with a similar scale as FIG. 3A, according to one embodiment.

FIG. 4 is an enlarged end view of the seal, according to one embodiment.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
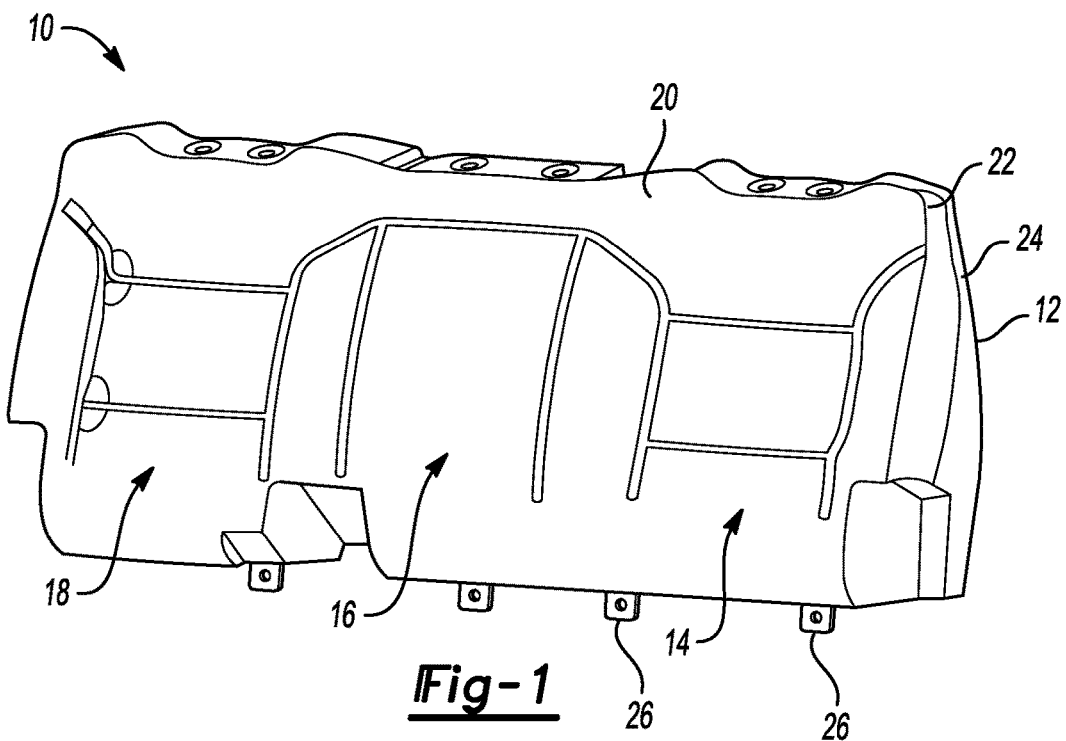
FIG. 1 illustrates a front perspective view of a seat back as part of a seating system for an automobile, according to one embodiment.

Referring to FIG. 1, a seating system 10 is shown. The seating system 10 may be part of or include a seat configured for use in vehicular or non-vehicular applications. Vehicular applications may include land vehicles, such as a car or truck, or non-land vehicles, such as aircraft or marine vessels. The seating system 10 may include a seat back 12 configured for attachment with a seat bottom (not shown).

The seat bottom (not shown) may be configured to support the seat of a user or seat occupant. The seat bottom may include a support structure, such as a seat bottom frame, seat pan, and/or support wires that may support and facilitate mounting of components of the seating system. The seat bottom may also include a seat bottom cushion.

Figure 2:
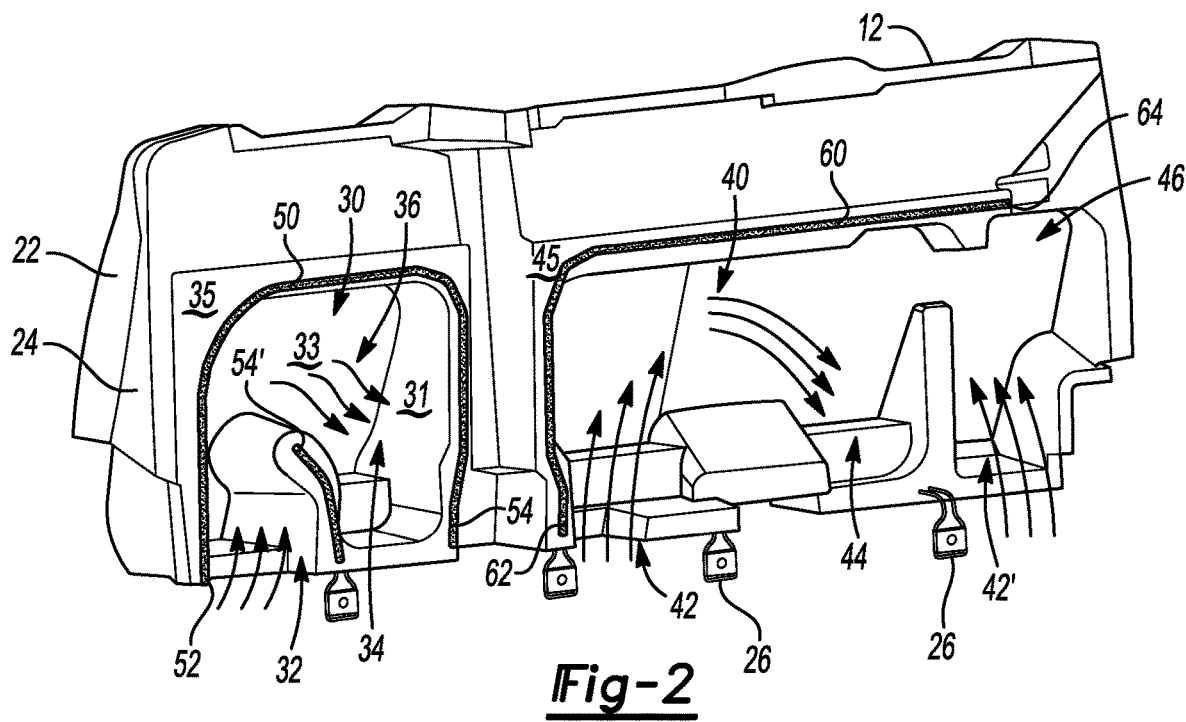
FIG. 2 illustrates a rear perspective view of the seat back of FIG. 1, in which the seat is provided with an acoustic seal on the rearward surface of the seat back for dampening or reducing sound realized in the cabin of the vehicle, according to one embodiment.

The seat back 12 may be configured to support the backs of one or more users or seat occupants. In at least one embodiment, the seat back 12 is pivotally disposed on the seat bottom. The seat back 12 may include a left side seating region 14, a center seating region 16, and a right side seating region 18. Directional terms such as left, center, and right refer to where an occupant would be located with respect to the vehicle while sitting on the seat. Each seating region 14, 16, 18 may be configured to support a back of a single user or seat occupant. As shown in FIG. 2, the seat back 12 may be split such that the left side seating region 14 may be rotated or folded with respect to the center seating region 16 and right side seating region 18, which may be a single integral unit.

Referring to FIGS. 1 and 2, the seat back 12 may also include a seat back cushion 20 supported by a seat back frame (not shown). The cushion 20 may be made of any suitable material, such as foam. In one embodiment, the cushion 20 includes two layers of foam—a first layer 22 of foam, and a second layer 24 rearward of the first layer with respect to the vehicle when installed. The two layers of foam may be mounted or adhered to one another. In one embodiment, the first layer 22 of foam is a polyurethane (PU) foam, and the second layer 24 of foam is an expanded polypropylene (EPP) foam. In another embodiment, the cushion is a single layer of cushion material, such as foam.

Referring to FIG. 2, a plurality of clips 26 may be mounted or attached to the second layer 24 of foam. The clips 26 provide a mounting region configured to enable the seat back 12 to be mounted to a frame (e.g., vehicle frame or body, not shown).

The seat back 12 may have a forward facing surface that is shown in FIG. 1, and a rearward facing surface that is shown in FIG. 2. The forward facing surface may be of the first layer 22 of foam, and the rearward facing surface may be of the second layer 24 of foam.

Passive pressure relief valves for venting pressure from an automotive cabin typically include a plastic housing with an elastomer flap that opens when the interior pressure is greater than the exterior pressure. The greater interior pressure forces the flap open and cabin air is exhausted through the valve until the pressure is equalized. This valve design is susceptible to noise and exterior elements entering the passenger compartment through the air extractor when the vehicle is moving. To reduce the amount of noise and exterior elements from entering the cabin, the passive pressure relief valves are sometimes designed as small as possible, which limits the rate at which the pressure relief valve may equalize pressure.

When cabin doors are closed, a sudden pressure rise may be created. Rapidly closing the cabin door may also rapidly increase the cabin air pressure, resulting in high closing efforts, potential discomfort to passengers, and noise. Increasing the pressure relief valves to accommodate the increase in air pressure relief may allow for more noise to enter the cabin than desirable. If current pressure relief valves are able to relieve the cabin pressure fast enough, then increasing the size of the pressure relief valve may allow for more noise and exterior elements to enter the cabin than desired. Either way, the current pressure relief valves require a tradeoff that may not be desirable to the drivers or passengers of the vehicle.

According to various embodiments of the present disclosure, the seat back 12 is provided with an air passageway configured to allow the air in the vehicle cabin to exit the vehicle cabin to equalize the cabin's air pressure when the doors are opened or closed. An acoustic seal is provided at or adjacent the air passageway to dampen or reduce sound that could travel through the passageway.

In one embodiment, the rearward facing surface of the left side seating region 14 of the seat back 12 defines a cavity 30. The cavity 30 includes or is in communication with an inlet 32 that receives air from the vehicle cabin. The cavity also includes or is in communication with an outlet 34 that sends the air to the atmosphere or outside environment. The outlet 34 may, for example, be coupled to another passageway outside of the seat that leads the air outside of the vehicle. The inlet 32 and outlet 34 are in fluid communication with one another via an intermediate passageway 36.

Likewise, the rearward facing surface of the portion of the seat back 12 with the center seating region 16 and the right side seating region 18 also includes a cavity 40. The cavity 40 includes or is in communication with an inlet 42 that receives air from the vehicle cabin. The cavity also includes or is in communication with an outlet 44 that sends the air to the atmosphere or outside environment. The outlet 44 may, for example, be coupled to another passageway outside of the seat that leads the air outside of the vehicle. The inlet 42 and outlet 44 are in fluid communication with one another via an intermediate passageway 46.

Thus, the seat back 12 includes two cavities 30, 40 that each define a passageway for transmitting air from the cabin to the ambient environment. The cavities 30, 40 can include sidewalls that lead forward to an inner cavity surface. For example, cavity 30 can be defined by a side wall 31 that leads to an inner cavity surface 33. The side wall 31 intersects with a planar surface 35 that may define the rearward-most surface of the seat back 12. The intersection of the side wall 31 and the planar surface 35 may define a perimeter of the cavity 30. The cavity 40 may be provided with similar side walls, planar surfaces, and a perimeter.

A seal 50 is provided about at least a portion of the perimeter of the cavity 30. The seal may be a type of or include a bulb seal. The seal 50 is shown in more detail in FIGS. 3A-4. In one embodiment, the seal 50 is attached to the planar surface 35 at or near an edge of the intersection of the planar surface 35 and the side wall 31. The seal 50 is a single, elongated tube attached or mounted to the planar surface 35, as will be described below. The seal 50 has a first end 52 adjacent the inlet 32 at a bottom end of the seat back, and a second end 54 at the bottom end of the seat back. In this fashion, the seal 50 is bent to take the general shape of the perimeter of the cavity 30 above the bottom of the seat back 12. In one embodiment, the cavity 30 is located entirely within the boundary of the seal 50, which is bent to take the shape of an inverse "U". In another embodiment, the seal 50 continues along the bottom end of the seat back and connects or is integral with another seal. In other words, the seal 50 can wrap around the outlet 34 and end at end 54'. In this fashion, the seal 50 turns almost a full 360 degrees (e.g., 340 degrees or greater) from the first end 52 to the second end 54'.

The seal 50 acts as an acoustic seal to dampen or reduce the sound passing from the cavity into the automotive cabin. The seal can be made of a synthetic material such as plastic or rubber. As will be described below, the seal 50 includes a rounded surface facing away from the planar surface 35. This rounded surface is configured to contact and conform to a contacting surface of the vehicle (e.g., vehicle body, dash, metal, etc.) rearward of the seat back 12. In other words, the seal 50 is a point of contact between the seat back 12 and a rearward surface. The seal 50 dampens or reduces the ability of the sound passing between these two components and through the cavity 30 relative to the cabin.

Another seal 60 is provided about at least a portion of the cavity 40. The seal 60 may be identical in material and structure as the seal 50. The seal 60, in the embodiment shown in FIG. 2, is mounted or attached to a planar surface 45 of the seat back 12 and bent to take the shape of an "L" or "J" to partially enclose the cavity. The seal 60 has a first end 62 adjacent the inlet 42, and a second end 64 that is vertically aligned with another inlet 42'. In another embodiment not shown in the Figures, the seal 60 is bent to take the shape of an inverse "U" similar to the seal 50, such that the seal 60 contains the cavity 40 within its boundary.

Referring to FIGS. 3A, 3B, and 4, the seal 50 is shown in isolation. FIG. 3A shows a side view of the seal 50, while FIG. 3B shows an end view of the seal to scale relative to the side view. FIG. 4 shows an enlarged end view of the seal 50 for additional clarity.

The seal has both a sealing region 72 and an attachment region 74. The sealing region 72 includes a hollow tube 76. Being made of a flexible material such as rubber or plastic, the tube 76 is configured to conform to a rearward surface (e.g., dash, metal, etc.) that presses against the outer region 78 of the tube 76. The sealing region 72 also dampens or reduces the noise that may otherwise be present between the interface of the seat back with the rearward surface.

The attachment region 74 includes a clip or fastener 80. The fastener 80 is configured to be pressed into the rear of the seat back 12, such as the planar surface 35 of the second layer 24 of foam. In one embodiment, the fastener includes a plurality of wings, such as first wing 82 and second wing 84. The wings are pointed with an apex toward an end 86 of the attachment region 74. The first wing 82 has its apex at the end 86 to facilitate the fastener being pressed into the foam material. The wings 82, 84 are in a stacked arrangement along a stem 88 and spaced from one another for additional support and attachment strength. The stem 88 extends into and attaches to the tube 76.

The angle and taper of the wings also inhibit removal, but do not prevent removal, of the seal 50 from the foam material. In use, a worker can align the seals 50, 60 for proper position with respect to the planar surface 35, and press the end 86 of the seals 50, 60 into the foam. The foam may have a slight void of material (e.g., crack, slit) to provide as a guide for the location of the seals 50, 60. Alternatively, markings or other indicia may be provided at the desired location of the seals 50, 60.

As illustrated in FIG. 3A, the attachment region 74 may extend along a linear axis of the seal 50 in an intermittent fashion. For example, the seal 50 may be provided with gaps 90 between successive attachment regions 74 along the seal. In other words, a plurality of the fasteners 80, rather than a single continuous fastener, may extend along the length of the seal 50. This provides additional flexibility in assembly while still maintaining a fastened connection with the foam.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A seating system for a vehicle, comprising:
    a seat back that includes a cushion that has a forward surface and a rearward surface facing a portion of the vehicle supporting the seat back, the rearward surface defining:
        an air inlet in fluid communication with a vehicle cabin for receiving air from the vehicle cabin,
        a cavity formed in the cushion;
        an air outlet in fluid communication with an ambient environment for sending the air to the ambient environment, wherein the air flows from the air inlet through the cavity and out of the air outlet; and
    a seal attached to the rearward surface of the cushion that is adapted to contact the portion of the vehicle supporting the seat back to acoustically seal between the rearward surface of the cushion and the portion of the vehicle supporting the seat back.

2. The seating system of claim 1, wherein the seal is a bulb seal that includes an attachment region attached into the rearward surface and a hollow tubular region extending out of the cushion.

3. The seating system of claim 2, wherein the attachment region includes a series of fasteners extending along a length of the hollow tubular region.

4. The seating system of claim 2, wherein the attachment region includes a fastener having a tip and a set of wings extending outward and toward the hollow tubular region for retaining the attachment region within the cushion.

5. The seating system of claim 4, wherein the fastener includes a second set of wings spaced between the tip and the hollow tubular region.

6. The seating system of claim 2, wherein the hollow tubular region includes a proximal end joined to the attachment region and a distal end contacting the portion of the vehicle supporting the seat back such that the hollow tubular region provides the acoustic seal between the portion of the vehicle supporting the seat back and the cushion.

7. The seating system of claim 1, wherein the cavity is defined by a curved perimeter, and the seal is disposed about the curved perimeter.

8. The seating system of claim 1, wherein the seat back defines a lower end and an upper end, and the seal is a single continuous member having:
    a first end attached to the cushion outboard of the air inlet,
    a second end attached to the cushion outboard of the air outlet, and
    a curved perimeter extending about the cavity between the first and second ends, wherein the seal is outboard of the cavity.

9. A vehicle seat, comprising:
    a seat back having a forwardly facing surface and a rearwardly facing surface, the rearwardly facing surface defining a cavity with an inlet in fluid communication with a vehicle cabin and an outlet in fluid communication with an ambient environment, the rearwardly facing surface being adapted to contact a rear seat back support; and
    a bulb seal attached to the rearwardly facing surface about at least a portion of a perimeter of the cavity to acoustically seal between the rearwardly facing surface of the seat back and the portion of a vehicle supporting the seat back.

10. The vehicle seat of claim 9, wherein the bulb seal includes a continuous bulb seal having a first end adjacent the inlet, a second end, and an intermediate region that at least partially encircles the outlet.

11. The vehicle seat of claim 9, wherein the bulb seal includes an attachment portion extending into the seat back and a sealing portion extending outboard of the seat back.

12. The vehicle seat of claim 11, wherein the attachment portion includes a shaft extending from the sealing portion and a plurality of wings extending from the shaft.

13. The vehicle seat of claim 11, wherein the sealing portion extends along an axis, and the attachment portion includes a plurality of fasteners extending from the sealing portion along the axis in an intermittent fashion.

14. The vehicle seat of claim 11, wherein the sealing portion includes hollow tube, and the sealing portion includes a fastener that attaches through the hollow tube.

15. A seating system for a vehicle having a vehicle cabin, the seating system comprising:

a foam seat portion having a rearwardly facing surface that defines a cavity providing a passageway configured to direct air from the vehicle cabin to an ambient environment when the vehicle cabin is pressurized, the rearwardly facing surface of the foam seat portion being supported by a rear seat back support; and an acoustic seal provided adjacent the passageway and configured to acoustically seal between the rearwardly facing surface of the foam seat portion and the rear seat back support about at least a portion of the passageway.

16. The seating system of claim 15, wherein the acoustic seal is attached to the foam seat portion.

17. The seating system of claim 16, further comprising a fastener extending from the acoustic seal and extending into a planar surface of the foam seat portion.

18. The seating system of claim 17, wherein the fastener includes a tapered wing to facilitate insertion of the fastener into the foam seat portion.

19. The seating system of claim 18, wherein the fastener includes a second tapered wing spaced from and located between the tapered wing and a rubber tubular seal portion of the fastener.

20. The seating system of claim 15, wherein at least a portion of the acoustic seal extends along an axis, and the acoustic seal includes a plurality of fasteners spaced apart along the axis that attach the acoustic seal to a planar surface of the foam seat portion.

\* \* \* \* \*